Jan. 16, 1968  D. W. COOPER ET AL  3,363,289
RELEASABLE SNAP HOOK
Filed July 25, 1966  2 Sheets-Sheet 2
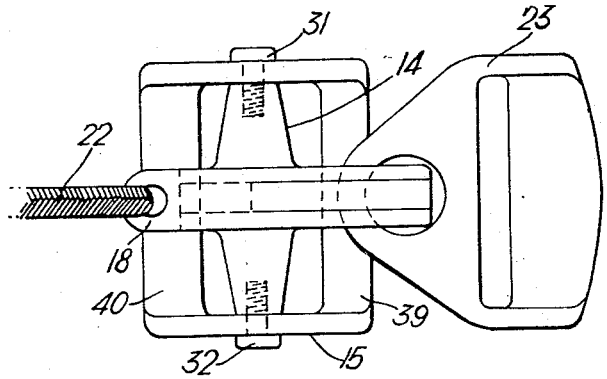
Fig. 4.
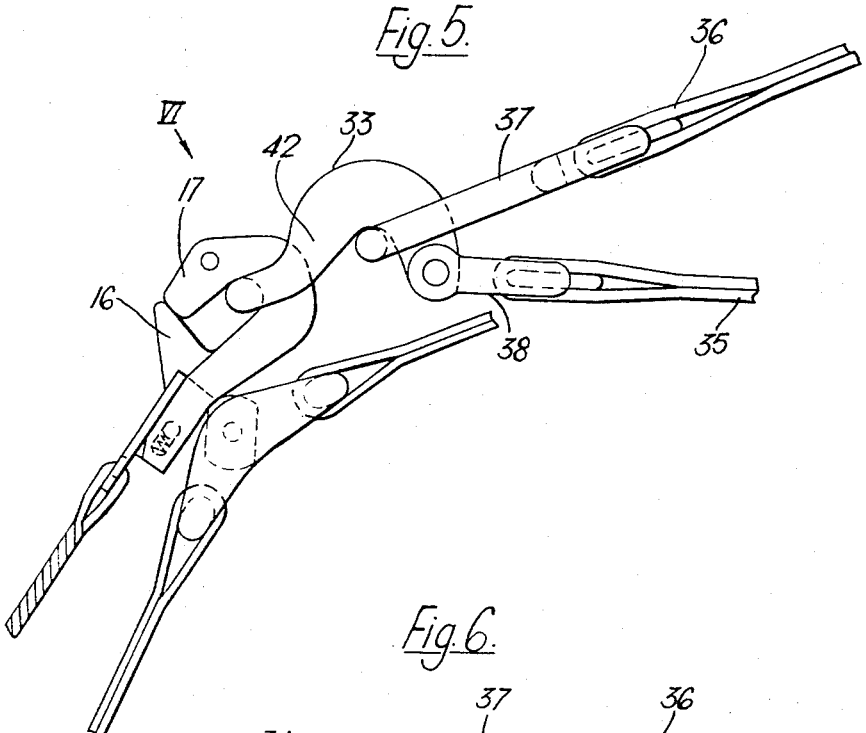
Fig. 5.
Fig. 6.
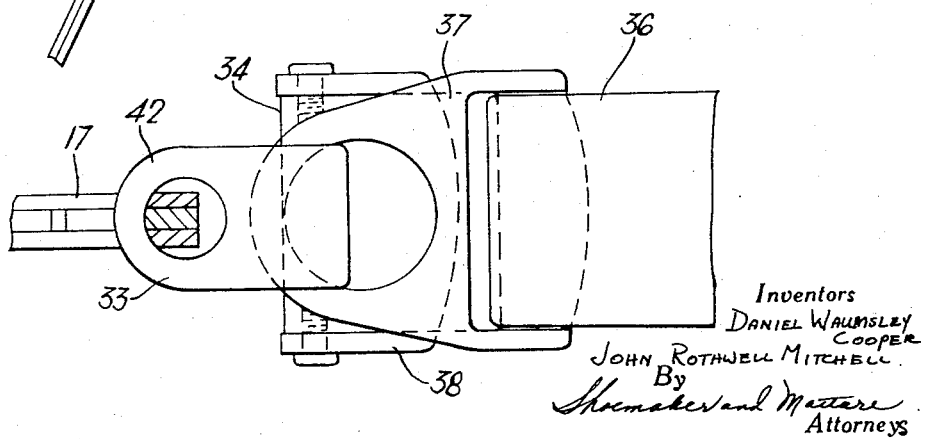
Inventors
Daniel Walmsley Cooper
John Rothwell Mitchell
By
Shoemaker and Mattare
Attorneys

United States Patent Office 3,363,289
Patented Jan. 16, 1968

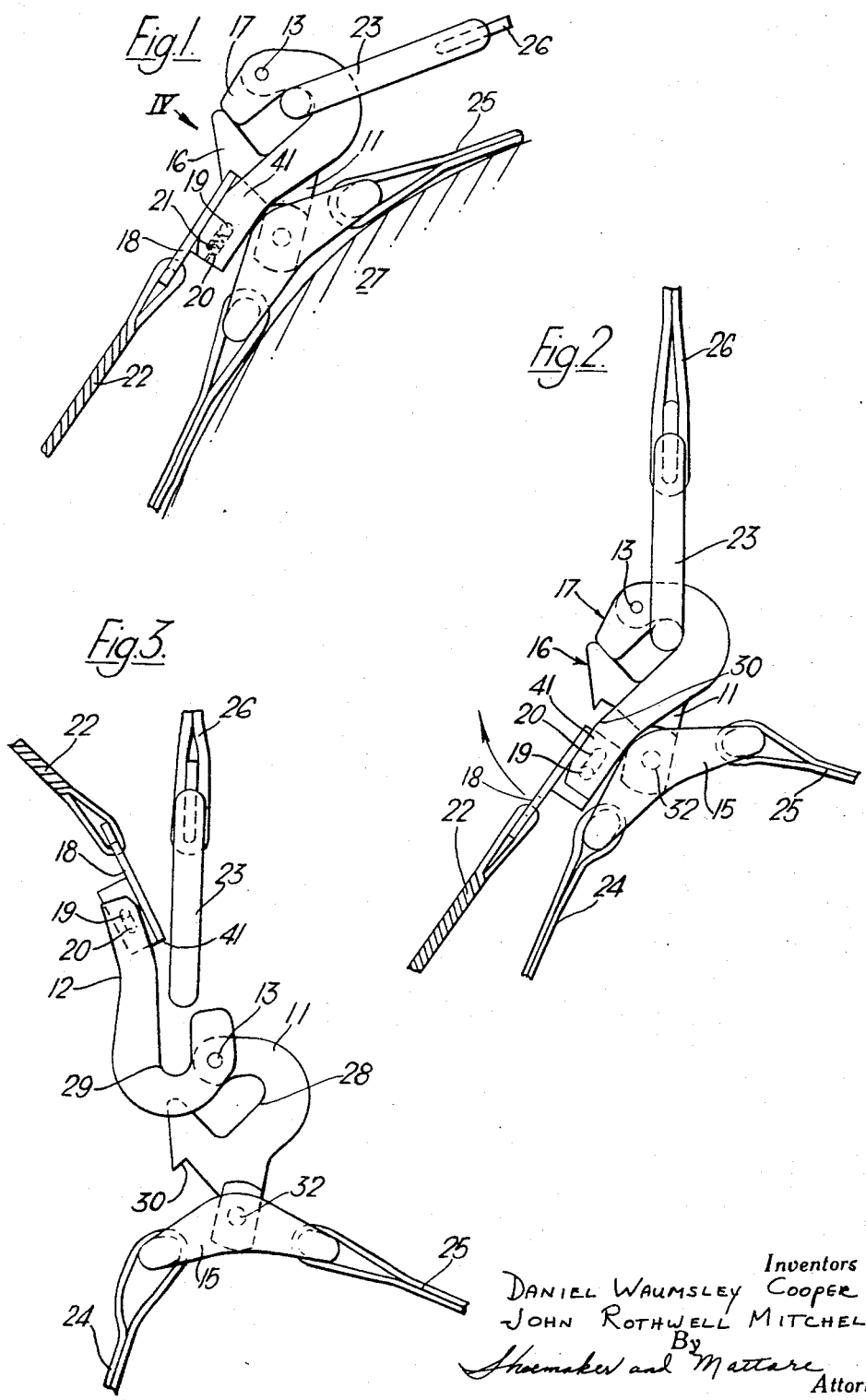

3,363,289
RELEASABLE SNAP HOOK
Daniel Waumsley Cooper and John Rothwell Mitchell, Woking, England, assignors to G. Q. Parachute Company Limited, Woking, Surrey, England
Filed July 25, 1966, Ser. No. 567,491
2 Claims. (Cl. 24—73)

ABSTRACT OF THE DISCLOSURE

Two similar open hook members are pivoted together adjacent their noses in substantially coinciding relation, one of the members being bifurcated and providing spaced walls between which the other member lies in locked relationship. The said other member carries a projection which normally, in locked position, substantially contacts the nose of the one member and closes the mouth thereof. The said projection has an undercut, barb-like, locking abutment, and the said one member slidably carries a key member which is slidable under the locking abutment and locks the member against relative hinging movement.

---

This invention relates to releasable connectors and particularly to connectors by which equipment, such as a parachute, can be connected to a harness for personal wear.

The object of the invention is to provide such a connector that will hold the equipment securely and yet can be opened quickly and easily so that the equipment is released from the connector. A particular use for the invention is to connect a parachute, or more than one parachute, to a parachutist and to provide means whereby the parachutist can release himself from the parachute or parachutes with a minimum of effort in emergencies, for example when the parachutist lands and before he is dragged, by his parachute, along the ground or, if he drops into water, under the surface of the water.

According to this invention a releasable connector comprises two hooked members connected together by means of a pivot, in which the two hooked members are so shaped and mounted that they can be moved into a position in which the mouths of both the hooked members are closed, and means are provided to hold the said hooked members in this position.

Again according to this invention a releasable connector comprises two hooked members connected together by means of a pivot, in which one of the said hooked members has a nose and the other of the said hooked members has an anvil, the said nose and anvil co-operating to close the mouths of the said hooked members, and means are provided to hold the said hooked members in this mouth closed position.

A releasable connector according to this invention also comprises two members connected together by means of a pivot, in which each of the members has a loop end in which a link or the like can be carried, and in which each of the members has a projection which co-operate with each other to hold the said link or the like in the said loop ends, and means are provided for holding the members in the position in which the said link or the like is held in the said loop ends.

The invention also comprises a harness for a parachutist fitted with a releasable connector as defined above.

The invention is described hereinafter with reference to the accompanying drawings of which FIGURE 1 illustrates one form of connector according to the invention, the connector being shown in the closed position, FIGURE 2 illustrates the same connector with the fastening member released, FIGURE 3 illustrates the same connector in the open position, FIGURE 4 is a plan view of the connector shown in FIGURE 1 looking in the direction of the arrow IV, FIGURE 5 illustrates a method of using the connector for more than one connection and FIGURE 6 is a plan view of the link shown in FIGURE 5.

The connector comprises two hook members 11 and 12 which are pivoted together at 13.

The hook member 11 has a hook portion and a shank portion and a mouth formed by the lip through which the pivot 13 passes and an anvil 16 which projects from the shank of hook member 11. This hook member 11 is integral with a cross head 14 (FIG. 4) which is mounted on pivots 31, 32 within a rectangular frame 15. The rectangular frame 15 has bars 39, 40 to which harness straps 24, 25 are joined.

The hook member 12 has a mouth formed on one side by a nose 17 which projects from the point 13 about which the hook member is pivoted. The nose 17 is of such a length that when the connector is in the closed position the nose meets (or overlies as described hereinafter) the anvil 16 on the shank of hook member 11 so that the mouth of the connector is closed.

The hook member 12 has a hook portion and a shank is bifurcated to provide a medial and longitudinal slot providing spaced plate-like elements, so that the hook member 11 swings between the two plates of the hook member 12 and the nose 17 on each arm of the hook member can overlie the anvil 16, but the complete closure of the mouth of the connector is not essential so long as any gap between the nose 17 and the anvil 16 is not large enough to pass the link 23 carried in the connector.

The hook member 12 carries at its end remote from the nose 17 a fastening member or key 18 mounted on a pin 19 which slides in a slot 20 in the shank portion of the hook member 12. A compression spring 21 (FIG. 1) presses against the pin 19 to retain the corner 41 of the fastening member 18 under a projection 30 on the underside of the anvil 16 on hook member 11. A pull cord 22 is attached to the fastening member 18.

In the example the connector carries a link 23 to which is attached a riser 26 connecting with the rigging lines of a parachute, not shown. The loop ends 28 and 29 of the hook members 11 and 12 are similarly shaped so that the members 11 and 12 share the load exerted by the parachute on the link 23.

Normally the connector is positioned on the shoulder 27 of a parachutist, the harness straps 24, 25 holding the connector securely to the parachutist. When the parachutist is suspended from his parachute the link 23 rides in the loop ends 28 and 29 of the hook members 11 and 12 as shown in FIGURE 1. The link 23 cannot slip out of the connector as the mouths of the hook members are closed by the meeting or overlap of the nose 17 and the anvil 16. The hook members 11 and 12 are held together by the pull on the link 23 and by the fastening member 18 the corner 41 of which engages the projection 30 on the lower side of the anvil 16.

If the parachutist desires to release himself from the parachute he first pulls the cord 22. This moves the fastening member 18, the pin 19 sliding along the slot 20 against the pressure of the spring 21, until the corner 41 of the fastening member 18 is moved out of engagement with the projection 30 on the anvil 16 as shown in FIGURE 2. The cord 22 is now lifted by the parachutist to swing the hook member 12 about pin 13 in the direction of the arrow on FIGURE 2 into the position shown in FIGURE 3. The link 23 can now slip past the mouth of the hook member 11 and out of the mouth of the hook member 12. Thus, the parachutist is freed from his parachute.

It is at times necessary for a parachutist to carry more than one parachute or to have more than one riser connecting his harness with the rigging lines of his parachute. It is possible to construct the hook members 11 and 12 so that more than one link can be carried in the connector, but it is at times preferred to use the connector with a single link but to arrange for the release of the connector to free the parachutist from both his main and reserve parachute.

The equipment illustrated in FIGURES 5 and 6 show how the coupling illustrated in FIGURES 1 to 4 can be used for this purpose. The connector is exactly the same as described above but the link 23 has been replaced with a cranked link 33 which is provided with a cross head 34. A link 38 carrying a riser 35 attached to the rigging lines of the main parachute is pivotally connected to the cross head 34 and a link 37 carrying a riser 36 attached to the reserve parachute is threaded over the tongue 42 of the cranked link 33. The cranked link 33 is then placed within the connector so that it is held by the interaction of nose 17 and anvil 16 as described above.

With this arrangement when the connector is opened, as described above, the link 33 is released and so the parachutist is released from both his main and his reserve parachute.

Although the hook member 12 is shown bifurcated, it will be appreciated that this is not essential. For example the member 11 could be bifurcated, or neither member need be bifurcated, or the members could each comprise a number of plates, not all of which need have noses or anvils, without departing from the invention.

To release the connector as described the pull cord must be pulled and lifted. If release by a single action is desired this can be arranged by connecting a line from the cord 22 to the nose 17, the line passing around the outside of the back of the hook members. With this arrangement when the line 22 is pulled the first movement drags the corner 41 of the fastening member 18 out of engagement with the projection 30 of the anvil and further movement of the line swings the hook member 12 about pivot 13 to release the link 23.

A covering, such as a fabric sleeve suitably fastened down with easily breakable connections such as press fasteners or touch tape, can be provided for the coupling to prevent the ingress of foreign matter until the full operation of the release handle has been made.

The invention is not restricted to the embodiment described above.

Having described our invention, what we claim as new and desire to secure by Letters Patent is:

1. A releasable connector comprising a first open hook member including a shank portion and a hook portion, said member having a medial longitudinal slot therein extending from points adjacent the ends of said member and providing spaced plate-like elements, the hook portion having transverse pintle openings adjacent the nose thereof; said shank portion having a planar top surface, a second open hook member positioned in the space between said spaced plates, and having a hook portion and a shank portion, the nose of said last-named hook portion having a transverse pintle received in said first-named pintle openings and hingedly connecting said first and second hook members with their hook openings substantially coinciding, said last-named hook member having an intermediate projection at the junction of the hook and shank portions thereof, said projection substantially contacts on one side thereof the nose of the hook portion of said first hook member and closes the opening thereof, said projection on the opposite side thereof being undercut to provide a barb-like abutment, said abutment being spaced above said planar top surface of the first hook member, locking means slidably connected to the shank of the first hook member, said means including a plate-like key element slidable on the planar top surface of said shank of said first hook member into locking position beneath the barb-like abutment to lock the members against relative hinging movement.

2. A releasable connector as claimed in claim 1, in which means is provided by which it can be attached to a harness for personal wear, said means comprising a rectangular frame, a cross head connected to said second hook member and mounted on pivots within the frame, said frame providing bars to which harness straps can be joined.

References Cited

UNITED STATES PATENTS

| 544,483 | 8/1895 | Eckert | 24—232 |
| 855,368 | 5/1907 | Watson | 24—241 |
| 1,362,512 | 12/1920 | Schermuly | 24—241 |
| 2,276,628 | 3/1942 | Quilter | 24—241 |

FOREIGN PATENTS

| 11,467 | 4/1897 | Great Britain. |

OTHELL M. SIMPSON, *Primary Examiner.*

WILLIAM FELDMAN, *Examiner.*

G. WEIDENFELD, *Assistant Examiner.*